United States Patent [19]
Boboli et al.

[11] 3,872,143
[45] Mar. 18, 1975

[54] PROCESS FOR THE PREPARATION OF A MIXTURE OF N-OCTYLTIN CHLORIDES WHICH IS ENTIRELY FREE FROM TRI-N-OCTYLTIN CHLORIDE

[75] Inventors: Fdyta Boboli; Wladyslaw Longin Malasnicki; Mieczyslaw Kowalski, all of Warsaw; Andrzej Pazgan, Sochaczew, all of Poland

[73] Assignee: Instytut Przemyslu Organiczego

[22] Filed: June 15, 1973

[21] Appl. No.: 370,231

Related U.S. Application Data
[63] Continuation of Ser. No. 148,882, June 1, 1971, abandoned.

[30] Foreign Application Priority Data
June 6, 1970    Poland .................................. 141123

[52] U.S. Cl. ............................................. 260/429.7
[51] Int. Cl. .............................................. C07f 7/22
[58] Field of Search ................................. 260/429.7

[56] References Cited
UNITED STATES PATENTS
3,387,012   6/1968   Jasching et al. ................. 260/429.7
3,745,183   7/1973   Katsumura et al. .............. 260/429.7

Primary Examiner—Arthur P. Demers
Attorney, Agent, or Firm—Stevens, Davis, Miller & Mosher

[57] ABSTRACT

Process for the preparation of a mixture of di- and mono-n-octyltin chloride which is entirely free from tri-n-octyltin chloride and has a high di-n-octyltin dichloride content consists in a reaction of tin and n-octyl chloride carrying in the presence of phosphorus trichloride as the catalyst with simultaneously distilling off the formed alpha-octene.

1 Claim, No Drawings

PROCESS FOR THE PREPARATION OF A MIXTURE OF N-OCTYLTIN CHLORIDES WHICH IS ENTIRELY FREE FROM TRI-N-OCTYLTIN CHLORIDE

This is a continuation, of application Ser. No. 148,882, filed June 1, 1971 now abandoned.

The invention relates to a process for the preparation of a mixture of di- and mono-n-octyltin chlorides which is entirely free from tri-n-octyltin chloride and has a high di-n-octyltin dichloride content.

Two processes for the preparation of n-octyltin chlorides are known. The first process consists in a three-stage reaction of tin tetrachloride with organometallic alkylation agents, mainly n-octylmagnesium or n-octylaluminium ones, and the other process consists in a one-stage reaction in which the metallic tin reacts directly with the n-octyl chloride.

The n-octyltin chloride mixtures obtained in these reactions and consisting of four or in the best case of three components, always contained a certain amount of the undesired tri-n-octyltin chloride, the removal of which by means of known methods, such as fractional vacuum distillation or hydrolysis, is difficult. The di-n-octyltin dichloride separated by said methods from the mixture, is not entirely free from the undesired tri-n-octyltin chloride.

It was unexpectedly found that a mixture of di- and mono-n-octyltin chlorides, which is entirely free from tri-n-octyltin chloride and has a high di-n-octyltin dichloride content, is obtainable according to the invention method, in the reaction of a tin powder and n-octyl chloride in the presence of a catalyst and at an elevated temperature of 175° – 200°C, if as the catalyst the hitherto unused, cheap and easily available phosphorus trichloride in an amount of 0.03 – 0.08 mol per 1 gram-atom of of tin is employed and if the reaction is conducted with simultaneously distilling off the alpha-octene arising during the process.

The application of the method according to the invention results in obtaining a mixture of n-octyltin chlorides which is entirely free from the undesired tri-n-octyltin chloride and contains apart from about 16% of mono-n-octyltin trichloride, mainly di-n-octyltin dichloride.

The absence of tri-n-octyltin chloride in the mixture obtained is attributed to the specific action of the phosphorus trichloride and to the introduction, for the first time into the process discussed, of a continuous distilling off the alpha-octene arising during the reaction.

The removal from the reaction mass, of the relatively low-boiling alphaoctene admits to conduct the process at higher temperatures, which, as it is known, do not favor the formation of tri-n-octyltin chloride.

The continuous removal of the alpha-octene, results also in ancillary advantages residing in affording possibilities for easily obtaining and maintaining during the whole process the best reaction temperature within the limits of 180°– 200°.

An advantage of the present invention is also the fact that there is no necessity of protecting the reaction mass against the moisture access, which in the case of using known methods is deemed to be indispensable.

The n-octyl chloride used in a 10–75% mol excess performs the duty of a solvent, the addition of which is entirely superfluous for creating a reaction medium. The n-octyl chloride excess as well as the n-octyltin trichloride are recovered from the reaction mass by distillation.

A great advantage of the invention is also the possibility of obtaining with a high yield n-octyltin chlorides which are less expensive and simultaneously offer more difficulties in obtaining them than analogous bromides and iodides, due to the lower reactivity of n-octyl chloride when compared with the reactivity of analogous iodide and bromide.

The obtained di- and mono-n-octyltin chlorides are known and highly appreciated intermediate products for the preparation of n-octyltin stabilizers in fabricating plastics, particularly polyvinyl chloride.

Their value as intermediate products will be the higher as the stabilizers obtained therefrom are deemed to be non-toxic.

EXAMPLE I

A mixture of 24 g (0,2 mol) of finely powdered tin, 90,0 g (0,6 mol) of n-octyl chloride, 9,6 g (0,04 mol) of n-octyl iodide and 1,2 g (0.0088 mol) of phosphorus trichloride is heated while stirring at a temperature of 180° – 200°C, about 20 ml of alpha-octene within about 6 hours being distilled off. From the reaction mass cooled down to a temperature of about 18°C, the unreacted tin and the formed tin dichloride are filtered off and from the filtrate obtained, the excess of unreacted n-octyl chloride and iodide are distilled off. The remainder in an amount of 62,5 g is mainly a mixture of about 78 % of di-n-octyltin dichloride and about 16% of octyl tin trichloride. After the n-octyltin trichloride is distilled off at reduced pressure, the remaining di-n-octyltin dichloride is subjected to the hydrolysis in an about 8% aqueous alcoholic solution of sodium hydroxide, One obtains 39,8 g of di-n-octyltin oxide /Sn found 33,0 %, Sn calculated 32,85 %/. The mono-n-octyltin trichloride is saponified also in an aqueous solution of sodium hydroxide at boiling temperature and one obtains 8,2 g of mono-n-octyltin acid. /Sn found 44,4 %, Sn calculated 44,8 %/.

EXAMPLE II

A mixture of 24 g /0,2 mol/ of finely powdered tin, 65,4 g /0,44 mol/ of n-octyl chloride, 9,6 g /0,04 mol/ of n-octyl iodide and 1,2 g 0,0088 mol/ of phosphorus trichloride is heated at a temperature of 180° – 200°, and alpha-octene is obtained within 4 hours. Continuing to proceed as in Example I, a remainder in a quantity of 56,3 g, containing 75,5 % df di-n-octyltin dichloride and 17,1 % of n-octyltin trichloride is obtained.

EXAMPLE III

A mixture of 24 g (0,2 mol) of finely powdered tin, 90 g (0,6 mol) of n-octyl chloride, 9,6 g (0,04 mol) of n-octyl iodide and 0,82 g (0,006 mol) of phosphorus trichloride is heated at a temperature of 180 – 200°C; alpha-octene is distilled off during 9 hours. Continuing to proceed as in Example I, one obtains a remainder in an amount of 60,2 g, containing 76,7 % of di-n-octyltin dichloride and 16,4 % of n-octyltin trichloride.

We claim:

1. A process for the preparation of a mixture of di- and mono-n-octyltin chlorides which has a high di-n-octyltin dichloride content comprising directly reacting tin, n-octyl chloride and n-octyl iodide in the presence of phosphorus trichloride as a catalyst at an elevated temperature of 175° – 200° C and simultaneously distilling off the formed alpha-octene during the course of the reaction, filtering off the unreacted tin and formed tin dichloride and distilling off from the filtrate the unreacted n-octyl chloride and n-octyl iodide, said phosphorus trichloride catalyst being present in an amount of 0.03 – 0.08 mol per 1 gram atom of tin.

* * * * *